Jan. 6, 1942.   R. H. LANGSAM ET AL   2,269,083
TIRE INFLATION INDICATOR
Filed Dec. 17, 1940   2 Sheets-Sheet 1
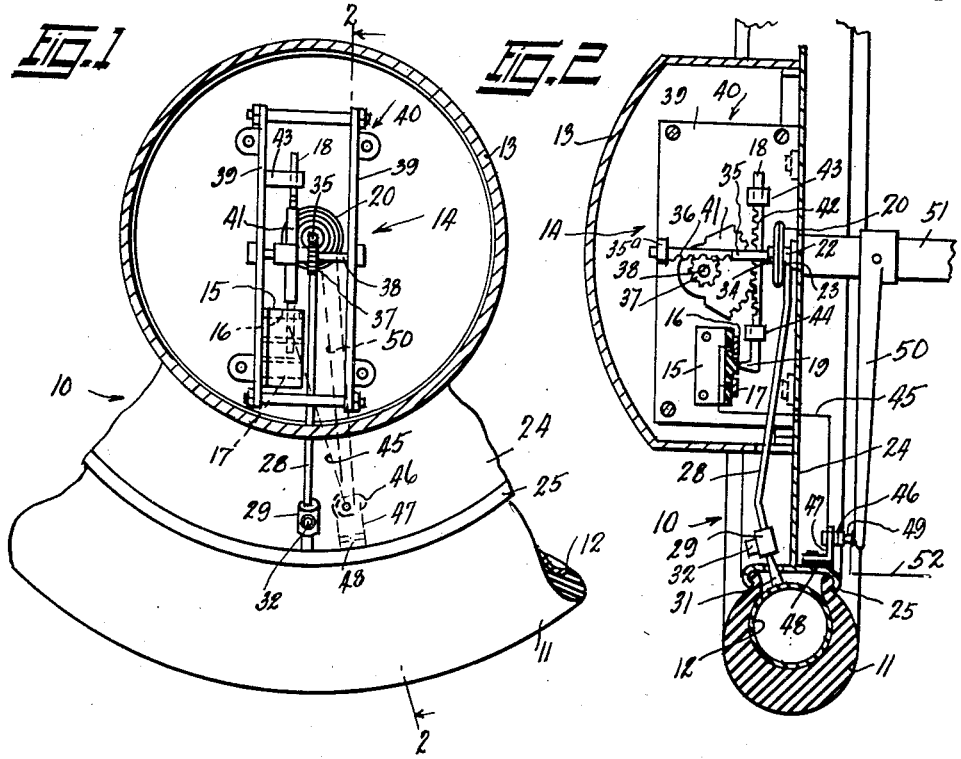
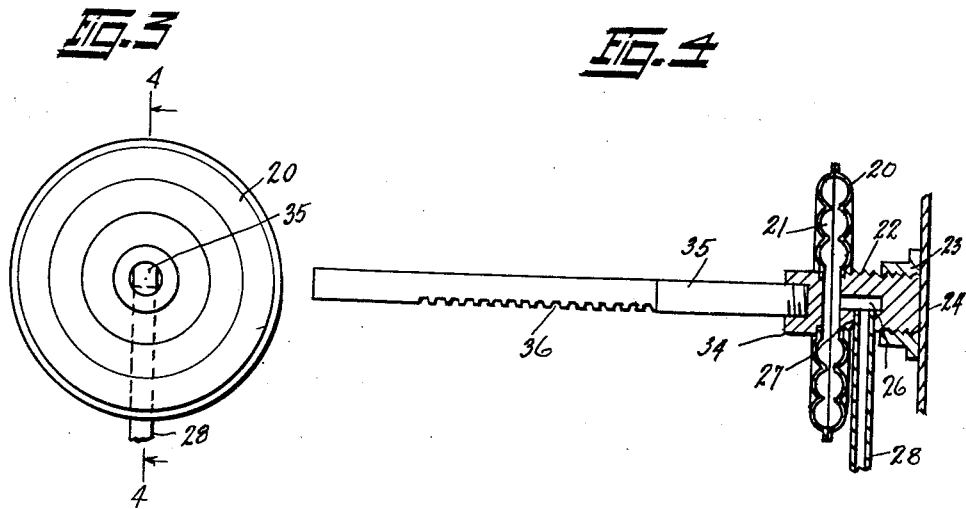
INVENTORS
Ralph H. Langsam
Irving A. Weintraub
Louis F. Simon
BY
ATTORNEY.

Jan. 6, 1942.        R. H. LANGSAM ET AL        2,269,083
              TIRE INFLATION INDICATOR
           Filed Dec. 17, 1940        2 Sheets-Sheet 2
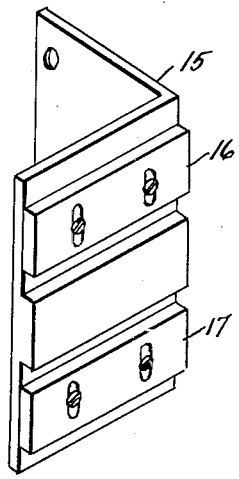
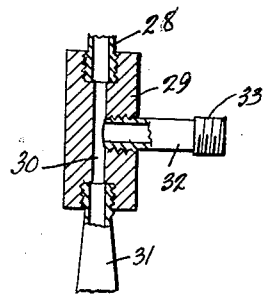
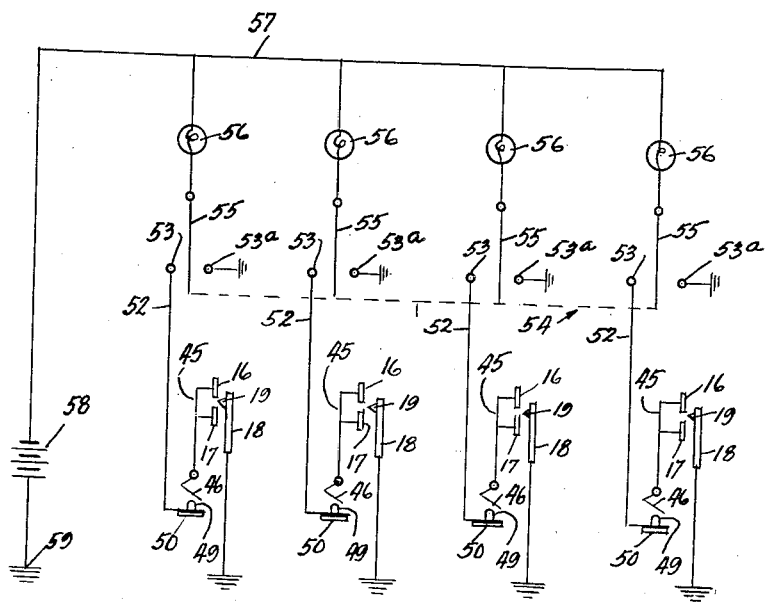
INVENTOR.
Ralph H. Langsam
Irving A. Weintraub
Louis F. Simon
BY
ATTORNEY.

Patented Jan. 6, 1942

2,269,083

UNITED STATES PATENT OFFICE 2,269,083

TIRE INFLATION INDICATOR

Ralph H. Langsam, Brooklyn, Irving A. Weintraub, New York, and Louis F. Simon, Brooklyn, N. Y.

Application December 17, 1940, Serial No. 370,502

3 Claims. (Cl. 200—58)

This invention relates to tire inflation indicators and has for one of its objects the provision of such a device which will indicate to the driver whether the pressure in the pneumatic tires of his automobile is normal, above, or below, while the car is being driven.

Another object of the invention is the provision of such a device which is adapted to be attached to any make automobile without materially altering same.

A further object of the invention is to provide a highly sensitive device of this nature, said device comprising a diaphragm actuated switch in which the movement of the diaphragm is multiplied to obtain the maximum amount of sensitivity required for controlling an electrical circuit in accordance with the tire pressure, and the operation of which will not be affected by the speed of rotation of the wheel.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a fragmental side view partly in section showing the invention as applied to a conventional type of automobile wheel.

Fig. 2 is a sectional view thereof taken on line 2—2 Fig. 1,

Fig. 3 is a front elevational view of the diaphragm and rack bar construction;

Fig. 4 is a sectional view thereof taken on line 4—4 Fig. 3;

Fig. 5 is a perspective view of the high and low pressure contact plate mounting;

Fig. 6 is a partial sectional view of the air valve fitting and

Fig. 7 is a circuit diagram showing the electrical connections between the various elements of the device.

Referring now to the drawings in detail, 10 indicates a conventional automobile wheel which carries the tire 11 and innerpneumatic tube 12. The wheel 10 is shown as provided with a hub cap 13 which may be secured in place in any suitable manner.

Covered by the said hub cap 13 and located as near as possible to the center of the wheel is a diaphragm operated switch 14, said switch preferably comprising a bracket 15 made of insulating material and to which there is adjustably secured an upper metallic contact plate 16 and a lower metallic contact plate 17. Cooperating with the said plates 16 and 17 is a bar 18 provided at its lower end with a contact point 19.

The said switch 14 is actuated by means of a diaphragm 20 having an air chamber 21, (see Fig. 4). The said diaphragm is provided at one side thereof with an outwardly threaded boss 22 which may screw into an inwardly threaded fitting 23 supported on a rib, plate or wall 24 of the wheel rim 25. The boss 22 has a central bore 26 which opens into the interior or air chamber 21 of the diaphragm 20 and a peripheral opening 27 which leads into the said bore 26 and into which one end of an air tube 28 extends, the opposite end of the tube fitting into a nipple or fixture 29 having a central bore 30 in communication with valve shell 31 affixed to the pneumatic tube 12 and from which the usual valve core has been removed. The said central bore 30 is also in communication with an air inlet 32 which is provided with the usual valve core not shown and with a threaded portion 33 to which may be secured an air hose when inflating the tire.

Secured to the opposite side of the diaphragm 20 is a hub or boss 34 in which there is screw threadedly supported a rod or bar 35 the sides of the forward end of which may be flattened and supported against rotation in a bearing 35a. The said flattened end may be provided with rack teeth 36 in mesh with a toothed pinion 37 carried on a cross shaft 38 rotatably supported in side walls 39 of a housing 40 secured to the plate or wall 24. The said shaft 38 also carries a gear segment 41 the teeth of which are in mesh with teeth 42 on the contact bar 18, the said bar being preferably made of flat or square stock and slidably supported in bearings 43 and 44.

It is to be understood that there is one switch as above described for each wheel and each pair of contact switch plates 16 and 17 are electrically connected by a common wire 45 connected to a preferably resilient contact plate 46 secured to a terminal bracket 47. The said bracket is secured to the wheel rim 25 and insulated therefrom by means of an insulation strip 48. Each contact plate 46 is engaged once on every revolution of the wheel by means of a stationary brush or contact 49 insulated from and carried at the end of any suitable stationary part as for instance an arm 50 secured to the axle housing 51. A wire 52 leads from each of the contacts 49 to a terminal 53 of a 4 pole double throw switch 54 located on the dash board of the automobile. In circuit with each switch blade 55 is an electric bulb 56 electrically connected to a wire 57 which is connected to one terminal of a battery 58, the other terminal of the said battery being grounded at 59. The rack bars 18 are also grounded and form a return for the current to the battery 58. The terminal 53 is used when the automobile is in operation and the second or grounded switch terminal 53a is used for testing the bulb 56.

The operation of the device is as follows: With normal pressure in the tires the contacts 19 are positioned between the plates 16 and 17 and out of contact with them. However, when there is too much pressure in any of the tires the diaphragm connected to said tire and which is of hollow construction will expand causing the rack bar or rod 35 to move forwardly and rotate the pinion 37 and shaft 38 which carries the gear segment 41, said segment being in mesh with the rack bar 18 moves the contact 19 into engagement with the upper plate 16 and closes the circuit between the said plate and the ground 59, and upon contact between the contact plate 46 and stationary contact 49 once for each rotation of the wheel 10 the circuit between the said plate 46 and its respective switch blade 55 and bulb 56 will be closed causing the said bulb to light up. When due to leakage the pressure in the tire falls below normal the diaphragm 20 will collapse causing a movement of the rack bar downwardly to contact the lower plate 17 and cause the bulb 56 to light up each time the contact plate 46 engages the stationary contact 49.

The contact plates 16 and 17 are adjustable towards and away from each other in order that the pressure for tires of various stages of use may be regulated, inasmuch as tires that are worn cannot withstand as much pressure as new tires.

It will be understood that during the inflation of a tire and with the plate 46 and stationary contact 49 touching and the switch 54 closed, the device will operate as the bulb 56 will light up first when the contact 19 is in low position, and will go out when said contact is broken as the rack 18 moves up, and will light up again should the said contact 19 move into engagement with the upper plate 16.

From the foregoing it will be seen that we have provided a simple yet highly efficient device for indicating the various stages of pressure in a tire, the said device being adaptable for use with any of the various makes of automobiles now in use.

The diaphragm type of pressure operated switch is used because of its simplicity of construction and ability to withstand centrifugal force, vibrations and other forces, however, any other adequate pressure operated means may be used in connection with the movement increasing mechanism of the present invention. Wherever the term "make-and-break" is used, it is to be understood that electrical switches generally are intended to be included in said term.

Having described our invention what we claim as new and desire to secure by Letters Patent is:

1. In a tire inflation indicator for an automotive vehicle having pneumatic tired wheels, pressure-responsive circuit control means mounted to rotate together with the wheel, said means comprising an expansible and contractible hollow diaphragm connected to a tire, a toothed bar carried by the diaphragm, a pinion in mesh with the toothed bar, a shaft upon which the pinion is secured, a substantially large gear segment secured to the said shaft, a slidable toothed rack in mesh with the gear segment, the said rack being electrically grounded to the vehicle, a pair of spaced apart electric contact plates electrically insulated from the vehicle, said rack comprising a contact point normally out of contact with the said plates but adapted to be selectively brought into contact with either one of said contact plates, whereby the existence of abnormal values of air pressure in the tire completes a circuit connection.

2. In a tire inflation indicator for an automotive vehicle having pneumatic tired wheels, pressure-responsive circuit control means mounted to rotate together with the wheel, said means comprising an expansible and contractible hollow diaphragm connected to a tire, a toothed bar carried by the diaphragm, a pinion in mesh with the toothed bar, a shaft upon which the pinion is secured, a substantially large gear segment secured to the said shaft, a slidable toothed rack in mesh with the gear segment, the said rack being electrically grounded to the vehicle, a pair of spaced apart electric contact plates adjustably mounted with respect to each other and electrically insulated from the vehicle, said rack comprising a contact point normally out of contact with the said plates but adapted to be selectively brought into contact with either one of said contact plates, whereby existence of abnormal values of pressure in the tire completes a circuit connection.

3. In a tire inflation indicator for an automotive vehicle having pneumatic tired wheels, pressure-responsive circuit control means mounted to rotate together with the wheel, said means comprising an expansible and contractible hollow diaphragm connected to a tire, a toothed bar carried by the diaphragm, a pinion in mesh with the toothed bar, a shaft upon which the pinion is secured, a substantially large gear segment secured to said shaft, a slidable toothed rack in mesh with the gear segment, the said rack being electrically grounded to the vehicle, a pair of spaced apart electric contact plates electrically insulated from the vehicle, said rack comprising a contact point normally out of contact with said plates but adapted to be selectively brought into contact with one or the other of said contact plates depending upon the air pressure in the tire.

RALPH H. LANGSAM.
IRVING A. WEINTRAUB.
LOUIS F. SIMON.